(No Model.)
T. T. MORROW.
SNAP HOOK.
No. 349,169. Patented Sept. 14, 1886.
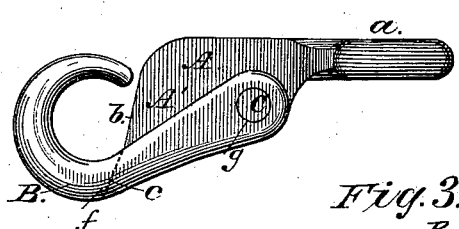
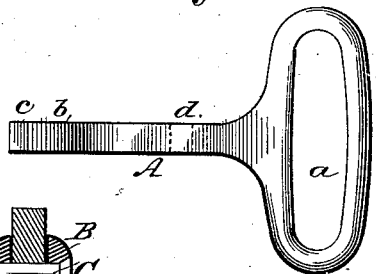
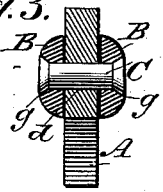
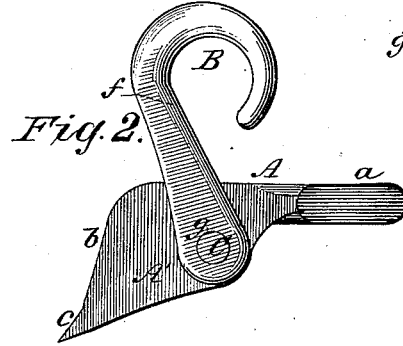
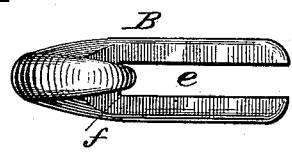
WITNESSES:
Fred G. Dieterich
Solon C. Kemon
INVENTOR:
Thos. T. Morrow
BY Munn & Co
ATTORNEYS.

UNITED STATES PATENT OFFICE.

THOMAS T. MORROW, OF CARO, MICHIGAN.

SNAP-HOOK.

SPECIFICATION forming part of Letters Patent No. 349,169, dated September 14, 1886.

Application filed March 31, 1886. Serial No. 197,353. (No model.)

*To all whom it may concern:*

Be it known that I, THOMAS T. MORROW, of Caro, in the county of Tuscola and State of Michigan, have invented a new and useful Improvement in Snap-Hooks, of which the following is a specification.

My invention relates to snap-hooks for harness and other purposes for which such hooks are commonly used; and the object of the invention is to provide a hook of simple construction and composed of few parts, which will not require the use of the spring usually employed to hold the parts in engagement.

The invention consists in a snap-hook composed of a loop and a hook pivoted together in such a manner that the strain in the line of draft will tend to close the hook and make it bear constantly upon the tongue without possibility of disengagement until the straps are slackened and the hook is turned by hand from its normal closed position to one nearly at right angles with the tongue.

It consists, further, in various details and features of construction, hereinafter described, and shown in the accompanying drawings, in which—

Figure 1 is a side elevation of my snap-hook closed. Fig. 2 is a similar view with the hook opened. Fig. 3 is a cross-section through the pivot. Fig. 4 is a detail plan view of the tongue. Fig. 5 is a detail view of the hook.

A represents the tongue of my snap-hook, made of a single piece of malleable cast-iron, and having a large loop, $a$, into which the breast-strap or other part of a harness is to be buckled. As shown in Figs. 1 and 2, the flat portion A' of the tongue has an inclined upper edge, $b$, and a beveled end, $c$, and is also provided with an opening or perforation, $d$, near the rear bottom corner, as shown.

B represents the hook, which is shown in detail in Fig. 5, and is also formed from malleable cast-iron. A deep recess, $e$, is formed in the hook, the wall $f$ of which is beveled to engage with the beveled end of the tongue when the parts are pivoted together. The tongue and hook are pivoted together by a rivet, C, passing through countersunk holes $g$ $g$ in the hook and the hole $d$ in the tongue.

As shown in the side elevation, Fig. 1, the hooked end of the part B is below the horizontal plane of the loop $a$ on the tongue when the hook is closed, and as the beveled end $c$ and wall $f$ are in contact it is evident that the draft on the hook will tend to crowd these edges closer together, and as at this time the extreme end of the hook is nearly or quite in contact with the adjacent edge of the tongue the hame or other ring is completely inclosed, and there is no possibility of its disengagement, for as the tendency of the parts is to remain in a closed position it requires not only the slackening of the straps, but a forcible application of the hand to throw the hook into the position shown in Fig. 2, when the ring may be instantly disengaged.

The advantages of my device are apparent; but it may be mentioned that by its construction the use of springs, which are constantly liable to break and get out of order, is entirely avoided, since the draft on the straps attached to it renders it impossible for it to become displaced or disconnected. Manifestly, the loop $a$ may be omitted or substituted by other suitable devices to facilitate attachment to a strap.

While I prefer to employ the construction as shown, it will be understood that slight variations of construction might be made without departing from the broad principles of my invention, which seeks to provide a snap-hook that will be closed by longitudinal draft apart on the hook proper and tongue.

What I claim is—

1. In a snap-hook, the combination of a hook proper and a tongue pivoted to the shank of said hook and movable rearwardly past said hook, and having a portion adapted to engage the shank of the hook and stop the parts in closed position, whereby strain on the point of the hook is obviated, substantially as set forth.

2. The combination of the tongue A, having the beveled end $c$, with the hook B, having the beveled recess $e$, said hook and tongue being pivoted together, substantially as described.

THOMAS T. MORROW.

Witnesses:
M. C. GOODELL,
A. L. GOODELL.